United States Patent
Hou (10) Patent No.: US 12,160,431 B2
(45) Date of Patent: Dec. 3, 2024

(54) MONITORING OF ABNORMAL HOST

(71) Applicant: NEW H3C TECHNOLOGIES CO., LTD., Zhejiang (CN)

(72) Inventor: Yefei Hou, Beijing (CN)

(73) Assignee: NEW H3C TECHNOLOGIES CO., LTD., Zhejiang (CN)

( * ) Notice: Subject to any disclaimer, the term of this patent is extended or adjusted under 35 U.S.C. 154(b) by 560 days.

(21) Appl. No.: 17/593,547

(22) PCT Filed: Mar. 19, 2020

(86) PCT No.: PCT/CN2020/080223
§ 371 (c)(1),
(2) Date: Sep. 20, 2021

(87) PCT Pub. No.: WO2020/187295
PCT Pub. Date: Sep. 24, 2020

(65) Prior Publication Data
US 2022/0174081 A1 Jun. 2, 2022

(30) Foreign Application Priority Data
Mar. 20, 2019 (CN) .......................... 201910212398.8

(51) Int. Cl.
*H04L 9/40* (2022.01)
*H04L 12/46* (2006.01)
*H04L 45/00* (2022.01)

(52) U.S. Cl.
CPC ...... *H04L 63/1416* (2013.01); *H04L 12/4641* (2013.01); *H04L 45/22* (2013.01); *H04L 63/1425* (2013.01); *H04L 63/1466* (2013.01)

(58) Field of Classification Search
CPC ............. H04L 12/4633; H04L 12/4641; H04L 2101/622; H04L 45/04; H04L 45/22;
(Continued)

(56) References Cited

U.S. PATENT DOCUMENTS 7,733,788 B1 * 6/2010 Michalski ........... H04L 63/1416
370/242
2014/0007232 A1 * 1/2014 Abidi .................. H04L 63/1483
726/22
(Continued)

FOREIGN PATENT DOCUMENTS

CN 101370019 A 2/2009
CN 102694876 A 9/2012
(Continued)

OTHER PUBLICATIONS

ISA State Intellectual Property Office of the People's Republic of China, Written Opinion of the International Searching Authority Issued in Application No. PCT/CN2020/080223, Jun. 17, 2020, WIPO, 7 pages.
(Continued)

*Primary Examiner* — Theodore C Parsons
(74) *Attorney, Agent, or Firm* — McCoy Russell LLP (57) ABSTRACT

The present disclosure provides a method and an apparatus for monitoring an abnormal host, and a data processing device. The method includes: host information of a deployed host is obtained from a controller, where the host information includes address information of the deployed host; routing information of a to-be-detected host is obtained, where the routing information includes the address information of the to-be-detected host; it is determined whether the address information of the deployed host includes the address information of the to-be-detected host; and it is determined that the to-be-detected host is an abnormal host when the address information of the deployed host does not include the address information of the to-be-detected host.

15 Claims, 4 Drawing Sheets

(58) Field of Classification Search
CPC ....... H04L 45/66; H04L 45/74; H04L 61/103; H04L 63/1416; H04L 63/1425; H04L 63/1466; Y02D 30/00
See application file for complete search history.

(56) References Cited

U.S. PATENT DOCUMENTS

| | | | |
|---|---|---|---|
| 2016/0359888 A1 | 12/2016 | Gupta et al. | |
| 2017/0111328 A1* | 4/2017 | Leon | H04L 9/14 |
| 2018/0027012 A1* | 1/2018 | Srinivasan | H04L 63/1416 726/4 |
| 2018/0191681 A1* | 7/2018 | Mihelich | H04L 63/20 |
| 2019/0386957 A1* | 12/2019 | Leon | H04L 63/0876 |
| 2021/0329029 A1* | 10/2021 | Vasseur | H04L 43/065 |

FOREIGN PATENT DOCUMENTS

| | | |
|---|---|---|
| CN | 103259732 A | 8/2013 |
| CN | 104780139 A | 7/2015 |
| CN | 105430113 A | 3/2016 |
| CN | 105812502 A | 7/2016 |
| CN | 106506200 A | 3/2017 |
| CN | 106506534 A | 3/2017 |
| CN | 106888217 A | 6/2017 |
| CN | 107018136 A | 8/2017 |
| CN | 107438068 A | 12/2017 |
| CN | 107465621 A | 12/2017 |
| CN | 107579988 A | 1/2018 |
| CN | 107888617 A | 4/2018 |
| CN | 107995162 A | 5/2018 |
| JP | 2000183968 A | 6/2000 |
| JP | 2005198090 A | 7/2005 |
| JP | 2006197518 A | 7/2006 |
| JP | 2011124774 A | 6/2011 |
| JP | 2012147377 A | 8/2012 |
| JP | 2014011674 A | 1/2014 |
| JP | 2016208092 A | 12/2016 |
| KR | 20070081116 A | 8/2007 |
| KR | 20160002269 A | 1/2016 |
| WO | 2016008212 A1 | 1/2016 |

OTHER PUBLICATIONS

European Patent Office, Extended European Search Report Issued in Application No. 20773249.6, Mar. 24, 2022, Germany, 9 pages.

Cui, L. et al., "When big data meets software-defined networking SDN for big data and big data for SDN," IEEE Network, vol. 30, No. 1, Jan.-Feb. 2016, Jan. 25, 2016, 8 pages.

ISA State Intellectual Property Office of the People's Republic of China, International Search Report Issued in Application No. PCT/CN2020/080223, Jun. 17, 2020, WIPO, 4 pages.

State Intellectual Property Office of the People's Republic of China, Office Action and Search Report Issued in Application No. 201910212398.8, Sep. 22, 2020, 19 pages. (Submitted with Machine/Partial Translation).

State Intellectual Property Office of the People's Republic of China, Office Action and Search Report Issued in Application No. 201910212398.8, May 19, 2021, 11 pages. (Submitted with Machine/Partial Translation).

Japanese Patent Office Action, Office Action Issued in Application No. 2021-555483, Oct. 18, 2022, 11 pages. (Submitted with Machine/Partial Translation).

* cited by examiner

MONITORING OF ABNORMAL HOST

CROSS REFERENCE TO RELATED APPLICATIONS

The present application is a U.S. National Phase of International Application No. PCT/CN2020/080223 entitled "MONITORING OF ABNORMAL HOST," filed on Mar. 19, 2020. International Application No. PCT/CN2020/080223 claims priority to Chinese Patent Application No. 201910212398.8 filed on Mar. 20, 2019. The entire contents of each of the above-listed applications are hereby incorporated by reference for all purposes.

TECHNICAL FIELD

The present disclosure relates to the field of network communication technologies, and in particular to a method and an apparatus for monitoring an abnormal host.

BACKGROUND

An Ethernet Virtual Private Network (EVPN) is a Layer 2 Virtual Private Network (VPN) technology, in which the control plane applies a Multi-Protocol Border Gateway Protocol (MP-BGP) to advise routing information, and the data plane forwards packets with a Virtual eXtensible Local Area Network (VXLAN) encapsulation manner. The VXLAN is a Layer 2 VPN technology based on an Internet Protocol (IP) network and Media Access Control (MAC) and User Datagram Protocol (UDP) encapsulation. The VXLAN can provide Layer 2 interconnection for scattered sites and provide traffic isolation for different tenants based on existing service providers or enterprise IP networks.

An EVPN includes hosts and edge devices. An edge device can learn a forwarding entry of a host and send data packets to the host using the forwarding entry. For example, upon receiving an Address Resolution Protocol (ARP) packet sent from host A, edge device A learns forwarding entry 1 of host A, and advises the address of host A to edge device B, so that edge device B learns forwarding entry 2 of host A. When edge device B receives a data packet sent from host B to host A, edge device B sends the data packet to edge device A using forwarding entry 2, and edge device A sends the data packet to host A using forwarding entry 1.

BRIEF DESCRIPTION OF THE DRAWINGS

In order to more clearly illustrate examples of the present disclosure or technical solutions in the prior art, the following briefly introduces the drawings that are used in the examples of the present disclosure or the description of the prior art, and it is apparent that the drawings in the description are only some examples described in the present disclosure. For those of ordinary skill in the art, other drawings can be obtained based on these drawings in the examples of the present disclosure.

DETAILED DESCRIPTION OF THE EMBODIMENTS

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although the terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the term "if" as used herein may be interpreted as "when" or "upon" or "in response to determining".

When an EVPN is attacked, an attacker may send a large number of attacking ARP packets through a host, and an edge device will learn a large number of forwarding entries, which will waste entry resources and affect processing performance of the edge device. Thus, in an example, upon receiving an ARP packet, the edge device may send the ARP packet to a controller, and the controller analyzes whether the ARP packet is sent by an attacker. If the ARP packet is sent by the attacker, the controller may generate alarm information and network administrators may handle the attack behavior.

However, since there are a large number of ARP packets in the EVPN, if the controller analyzes whether these ARP packets are sent by the attacker, the workload of the controller is rather large, which will consume a large number of controller resources and reduce processing performance.

Figure 1:
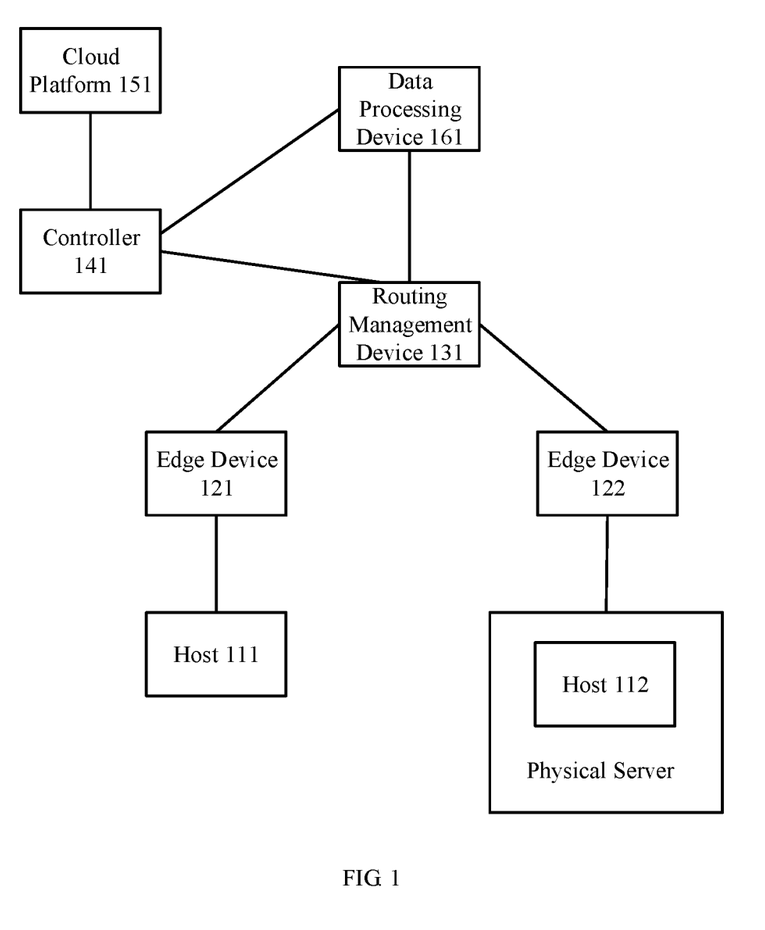
FIG. 1 is a schematic diagram illustrating an application scenario according to an example of the present disclosure.

An example of the present disclosure provides a method of monitoring an abnormal host. The method may be applied to a network, such as an EVPN, including a host, an edge device, a controller, a cloud platform, a routing management device, and a data processing device. FIG. 1 is a schematic diagram illustrating an application scenario according to an example of the present disclosure. In FIG. 1, host 111 and host 112 are taken as an example for description. In actual applications, the number of hosts can be larger. In addition, edge device 121 and edge device 122 are taken as an example for description. In actual applications, the number of edge devices can be larger.

Hosts 111 and 112 may be virtual machines deployed on a physical server, or may be physical servers, or other types of hosts, such as personal computers, terminal devices, and mobile terminals.

Edge devices 121 and 122 may be VXLAN Tunnel End Point (VTEP) devices, or other types of edge devices. Further, the VTEP device may be used as an edge device of the EVPN, and all processing related to VXLAN is performed on the VTEP device.

Controller 141 can be a Software Defined Network (SDN) controller, or can be another type of controller. Cloud platform 151 can be an Openstack cloud platform or another type of cloud platform. The EVPN uses an Openstack cloud platform and an SDN controller to implement the control plane functions.

Routing management device 131 is to collect all routing information in the EVPN. For example, routing management device 131 may be a Route Reflector (RR) or another type of device.

Data processing device 161 may be a device in a big data processing system. Data processing device 161 may use big data technology to implement functions such as data collection, data analysis, data storage, data statistics, data mining, and so on.

Before describing the method of monitoring an abnormal host in the example of the present disclosure, the following technology is described first.

1. Host type. A host in the examples of the present disclosure can be classified into a deployed host and a to-be-detected host. The deployed host is a host that is actually deployed on a network and is a legitimate host. Deployed hosts can include an online host and an offline host. The online host is a host that has accessed the network, the offline host is a host that has not accessed the network. Both the online host and the offline host are legitimate hosts that are actually deployed on the network.

The to-be-detected host is a host that is required to be detected. The method of monitoring an abnormal host in the examples of the present disclosure is to detect whether the to-be-detected host is an abnormal host. If the to-be-detected host is the abnormal host, the to-be-detected host does not belong to the deployed host, and is required to be handled with abnormality. If the to-be-detected host is not the abnormal host, that is, the to-be-detected host is a normal host, the to-be-detected host belongs to the deployed host, and is allowed to access the network.

2. The controller obtains host information of the deployed host and stores the host information locally.

In one example, the cloud platform may create a host for a tenant (for example, create a virtual machine for the tenant on a physical server, or assign a physical server to the tenant) and assign host information to the host. For convenient distinguishing, all hosts created by the cloud platform for tenants are referred to as the deployed host. Then, the cloud platform sends the host information of the deployed host to the controller, and the controller stores the host information.

It should be noted that all deployed hosts in the EVPN may be created by the cloud platform, that is, the host information sent by the cloud platform to the controller includes the host information of all deployed hosts.

The host information may include, but is not limited to, address information and a host identifier. Further, the address information may include, but is not limited to, an IP address, a MAC address, and a network identifier. The network identifier can be, for example, VNI (VXLAN Network Identifier). If the host is a virtual machine deployed on a physical server, the host identifier can be a device identifier of the physical server where the virtual machine is located. If the host is a physical server, the host identifier can be a device identifier of the physical server.

See Table 1 for an example of the host information stored in the controller. These pieces of host information are exemplary host information of all deployed hosts in the EVPN. These pieces of host information will be used as an example for illustration later.

TABLE 1

| Serial Number | IP Address | MAC Address | Network Identifier | Host Identifier |
|---|---|---|---|---|
| 1 | IP address A | MAC address A | VNI1 | aaa |
| 2 | IP address B | MAC address B | VNI1 | bbb |
| 3 | IP address C | MAC address C | VNI2 | ccc |
| 4 | IP address D | MAC address D | VNI2 | ddd |
| ... | ... | ... | ... | ... |

3. The controller may obtain the Link Layer Discovery Protocol (LLDP) information of the deployed host and store the LLDP information of the deployed host locally. The LLDP information may include, but is not limited to, a host identifier corresponding to a deployed host, and device information of an edge device associated with the deployed host. The device information may include an IP address and/or a MAC address.

In an example, if the deployed host is a virtual machine deployed on a physical server, the host identifier corresponding to the deployed host may be a device identifier of the physical server where the virtual machine is located, and the edge device associated with the deployed host may be an edge device connected to the physical server where the virtual machine is located. Alternatively, if the deployed host is a physical server, the host identifier corresponding to the deployed host may be a device identifier of the physical server, and the edge device associated with the deployed host may be an edge device connected to the physical server.

Referring to the above example, the deployed hosts may include the online host and the offline host. For the online host, the following manner may be adopted to obtain the LLDP information of the online host.

As shown in FIG. 1, when host 111 gets online, that is, when host 111 becomes an online host, host 111 can send an LLDP packet to edge device 121 which is connected to host 111, and the LLDP packet includes a management address, the host identifier of host 111, and the like. Upon receiving the LLDP packet, edge device 121 can send the LLDP packet to controller 141 through OpenFlow.

Controller 141 can send a control flow table to edge device 121. This control flow table is used to enable edge device 121 to send an LLDP packet to the controller 141. For example, matching fields of this control flow table include that a protocol type is an LLDP type and an action set includes sending to the controller. Based on this, upon receiving the LLDP packet, since the LLDP packet matches the control flow table, edge device 121 may send the LLDP packet to controller 141.

Upon receiving the LLDP packet, controller 141 obtains the management address of host 111 and the host identifier of host 111 from the LLDP packet. In addition, since controller 141 may manage all edge devices, controller 141 can also obtain device information (such as IP address, a MAC address, and so on) of edge device 121 upon receiving the LLDP packet sent by edge device 121. In a word, controller 141 can obtain the host identifier of host 111 and the device information of edge device 121, and the host identifier and the device information are included in the LLDP information of host 111.

For the offline host, the following manners may be used to obtain LLDP information of the offline host.

(1) Assuming that host 112 is not online, and offline host 112 is a virtual machine deployed on a physical server, while assuming that the physical server is already online, the physical server may send an LLDP packet to edge device 122 which is connected to the physical server. The LLDP packet includes the host identifier of the physical server, which is the host identifier of all virtual machines deployed on the physical server.

Upon receiving the LLDP packet, edge device 122 sends the LLDP packet to controller 141. Upon receiving the LLDP packet, controller 141 obtains the host identifier of the physical server and device information (such as the IP address, the MAC address, and so on) of edge device 122 from the LLDP packet, where the host identifier of the physical server and the device information of edge device 122 are included in the LLDP information of host 112.

(2) Assuming that host 111 is not online and offline host 111 is a physical server, edge device 121 can send an LLDP packet to host 111. The LLDP packet may carry device information (such as the IP address, the MAC address, and so on) of edge device 121. In an example, although host 111 is not online, its operating system and LLDP daemon are still working normally, so host 111 may receive the LLDP packet sent by edge device 121 when host 111 is not online. Upon receiving the LLDP packet, host 111 may send the device information of edge device 121 and the host identifier of host 111 to cloud platform 151. Since the host is directly controlled by the cloud platform, the host may send information to the cloud platform through an internal channel. Cloud platform 151 sends the device information of edge device 121 and the host identifier of host 111 to controller 141, and the device information of edge device 121 and the host identifier of host 111 are included in the LLDP information of edge device 121.

In view of above, controller 141 can obtain the LLDP information of each deployed host and store the LLDP information of each deployed host. Table 2 is an example of the LLDP information.

TABLE 2

| Host Identifier | Device Information of Edge Device |
| --- | --- |
| aaa | IP address 1 and MAC address 1 |
| bbb | IP address 2 and MAC address 2 |
| ccc | IP address 3 and MAC address 3 |
| ddd | IP address 4 and MAC address 4 |
| ... | ... |

4. A routing management device receives routing information and synchronizes the routing information to an edge device.

In an example, as shown in FIG. 1, when host 111 gets online, host 111 sends an ARP packet (such as an ARP request packet, a gratuitous ARP packet, or the like) to edge device 121. Upon receiving the ARP packet, edge device 121 can record, in a forwarding entry, a correspondence between a source address of the ARP packet (that is, an address of host 111, such as the IP address and/or the MAC address) and an ingress port of the ARP packet.

Further, upon receiving the ARP packet, edge device 121 can also generate a BGP message (such as an MP-BGP message). The BGP message can include routing information, and the routing information may include but is not limited to: address information of host 111 (the address information may include the IP address, the MAC address, and a network identifier), and device information of edge device 121 (the device information may include the IP address, the MAC address, and the like).

After generating the BGP message, edge device 121 may send the BGP message to edge device 122. Upon receiving the BGP message, edge device 122 can obtain the address information of host 111 from the BGP message, and record, in a forwarding entry, a correspondence between the address information (such as the IP address, the MAC address, and the network identifier) of host 111 and a tunnel. There is no restriction on the learning process of the forwarding entry. The tunnel may be a tunnel between edge device 122 and edge device 121, such as a VXLAN tunnel.

Edge device 121 sends the BGP message to edge device 122, which may include but is not limited to the following two manners.

Manner 1. Edge device 121 may directly send the BGP message to edge device 122.

Manner 2. Edge device 121 may send the BGP message to routing management device 131. Upon receiving the BGP message, routing management device 131 sends the BGP message to edge device 122.

To implement manner 1, any two edge devices need to establish BGP peers. If, for instance, there are 100 edge devices, each edge device needs to establish BGP peers with other 99 edge devices, which consumes a large number of network resources and CPU (Central Processing Unit) resources.

To implement manner 2, routing management device 131 (e.g., a route reflector) can be deployed in the EVPN. Thus, each edge device only needs to establish a BGP peer with routing management device 131, and no longer establish BGP peers with other edge devices, therefore reducing consumption of network resources and CPU resources.

When routing management device 131 is deployed in the EVPN, the manner 2 may be used to transmit the BGP message. That is, when each edge device sends a BGP message, the edge device sends the BGP message to routing management device 131. Routing management device 131 sends the BGP message to other edge devices.

In an example of the present disclosure, the manner 2 is taken as an example for description. When the manner 2 is adopted, routing management device 131 can collect all BGP messages generated in the EVPN. Each BGP message includes routing information published by a publisher, such as the address information of the host and the device information of the edge device.

Figure 2:
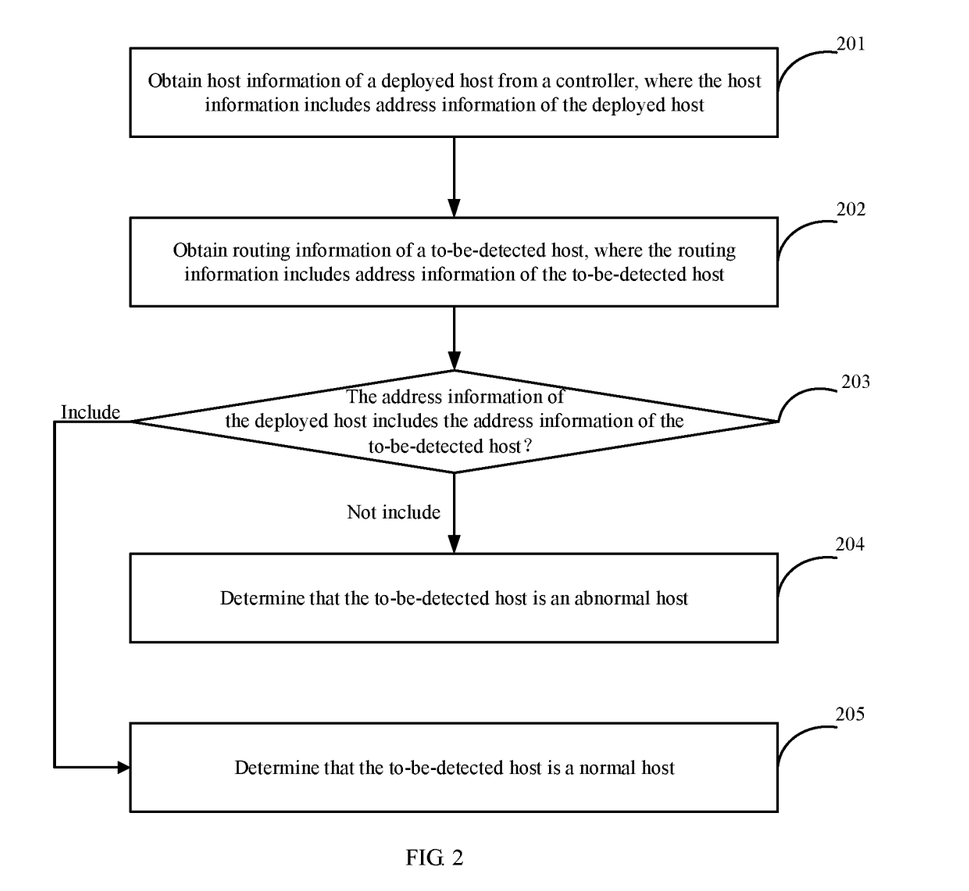
FIG. 2 is a flowchart illustrating a method of monitoring an abnormal host according to an example of the present disclosure.

In the above application scenario, the present disclosure provides a method of monitoring an abnormal host. FIG. 2 is a flowchart illustrating a method of monitoring an abnormal host. As shown in FIG. 2, the method may be applied to a data processing device, and the method may include the following steps.

At step 201, host information of a deployed host is obtained from a controller, where the host information includes address information of the deployed host. In addition, the host information may include a host identifier of the deployed host.

Referring to the above example, the controller has stored the host information of all deployed hosts in the EVPN, so the data processing device can obtain the host information of all deployed hosts in the EVPN from the controller. As shown in Table 1, the host information may include, but is not limited to, address information and a host identifier, and the address information may include an IP address, a MAC address, a network identifier, and the like.

At step 202, routing information of a to-be-detected host is obtained, where the routing information includes address information of the to-be-detected host. The to-be-detected host is a host that is required to be detected, and is either an abnormal host or a normal host.

In an example, the data processing device can negotiate and establish a BGP peer with the routing management device. Specifically, a BGP protocol can be configured on the data processing device. Thus, the data processing device can negotiate and establish the BGP peer with the routing management device, and there is no restriction on the process of establishing the BGP peer.

In an example, obtaining the routing information of the to-be-detected host can include, but is not limited to, receiving the routing information of the to-be-detected host sent by the routing management device.

Specifically, since the data processing device has negotiated and establish the BGP peer with the routing management device, each time the routing management device receives routing information, the routing management device can send the routing information to the data processing device.

Specifically, referring to the above example, the routing management device can collect all BGP messages generated in the EVPN. A BGP message includes routing information and the routing information may include address information of a to-be-detected host, and device information of an edge device associated with the to-be-detected host. Since the data processing device has negotiated and established the BGP peer with the routing management device, the routing management device sends each BGP message to the data processing device when the routing management device collects each BGP message. Upon receiving the BGP message, the data processing device may obtain the routing information from the BGP message, such as the address information of the to-be-detected host and the device information of the edge device associated with the to-be-detected host.

At step 203, it is determined whether the address information of the deployed host includes the address information of the to-be-detected host.

When the address information of the deployed host does not include the address information of the to-be-detected host, it can proceed to perform step 204, and when the address information of the deployed host includes the address information of the to-be-detected host, it can proceed to perform step 205.

At step 204, it is determined that the to-be-detected host is an abnormal host.

At step 205, it is determined that the to-be-detected host is a normal host.

In an example, as shown in Table 1, the data processing device can obtain the host information of all deployed hosts in the EVPN from the controller. Based on this, when the host information shown in Table 1 includes the address information of the to-be-detected host, it can be determined that the to-be-detected host is a normal host. When the host information shown in Table 1 does not include the address information of the to-be-detected host, it can be determined that the to-be-detected host is an abnormal host.

In one case, as shown in FIG. 1, when host 111 (assuming the to-be-detected host) gets online, host 111 sends an ARP packet to edge device 121. If host 111 is a normal host, the ARP packet carries real address information, such as IP address A and MAC address A.

Upon receiving the ARP packet, edge device 121 can generate a BGP message for host 111 and send the BGP message to routing management device 131. Upon receiving the BGP message, routing management device 131 can send the BGP message to data processing device 161.

The BGP message may include routing information. The routing information may include, but is not limited to, IP address A of host 111, MAC address A of host 111, a network identifier (such as VNI1) of host 111, and device information (IP address 1 and MAC address 1) of edge device 121.

In this case, the address information of host 111 included in the routing information is IP address A, MAC address A, and network identifier VNI1. Then it is decided whether the host information shown in Table 1 includes this address information. Since the host information shown in Table 1 includes this address information, it may be determined that host 111 is a normal host.

In another case, as shown in FIG. 1, when host 111 (assuming the to-be-detected host) gets online, host 111 sends an ARP packet to edge device 121. If host 111 is an abnormal host (e.g., an attacker), the ARP packet carries address information forged by the attacker, such as IP address AAA and MAC address AAA.

Upon receiving the ARP packet, edge device 121 can generate a BGP message for host 111 and send the BGP message to routing management device 131. Upon receiving the BGP message, routing management device 131 can send the BGP message to data processing device 161.

The BGP message may include routing information, and the routing information may include, but is not limited to, IP address AAA of host 111, MAC address AAA of host 111, a network identifier (such as VNI1) of host 111, and device information (IP address 1 and MAC address 1) of edge device 121.

In that case, the address information of host 111 included in the routing information is IP address AAA, MAC address AAA, and network identifier VNI1. Then it is decided whether the host information shown in Table 1 includes this address information. Since this address information is not included in the host information shown in Table 1, it can be determined that host 111 is an abnormal host.

In an example, when data processing device 161 determines that host 111 is an abnormal host, data processing device 161 may also generate alarm information for network administrators to handle an attack behavior, and the processing process will not be elaborated herein.

Based on the above technical solution, in the examples of the present disclosure, the data processing device (usually a big data processing system) can obtain the host information of the deployed host from the controller, and obtain the routing information of the to-be-detected host from the routing management device. The data processing device can analyze whether the to-be-detected host is an abnormal host based on the host information and routing information, so as to utilize the data collection and data processing capabilities of the big data processing system, and accurately analyze whether the to-be-detected host is an abnormal host. The above method does not require the controller to analyze whether the to-be-detected host is an abnormal host, which can reduce workload of the controller, save processing resources of the controller, and improve processing performance of the controller. In the above solution, based on the big data technology, whether the to-be-detected host is an abnormal host is analyzed, and host behavior analysis, anomaly detection, and error correction are performed, so that network administrators can accurately obtain the network access information of each host and quickly perceive the abnormal access behavior of a host.

Figure 3:
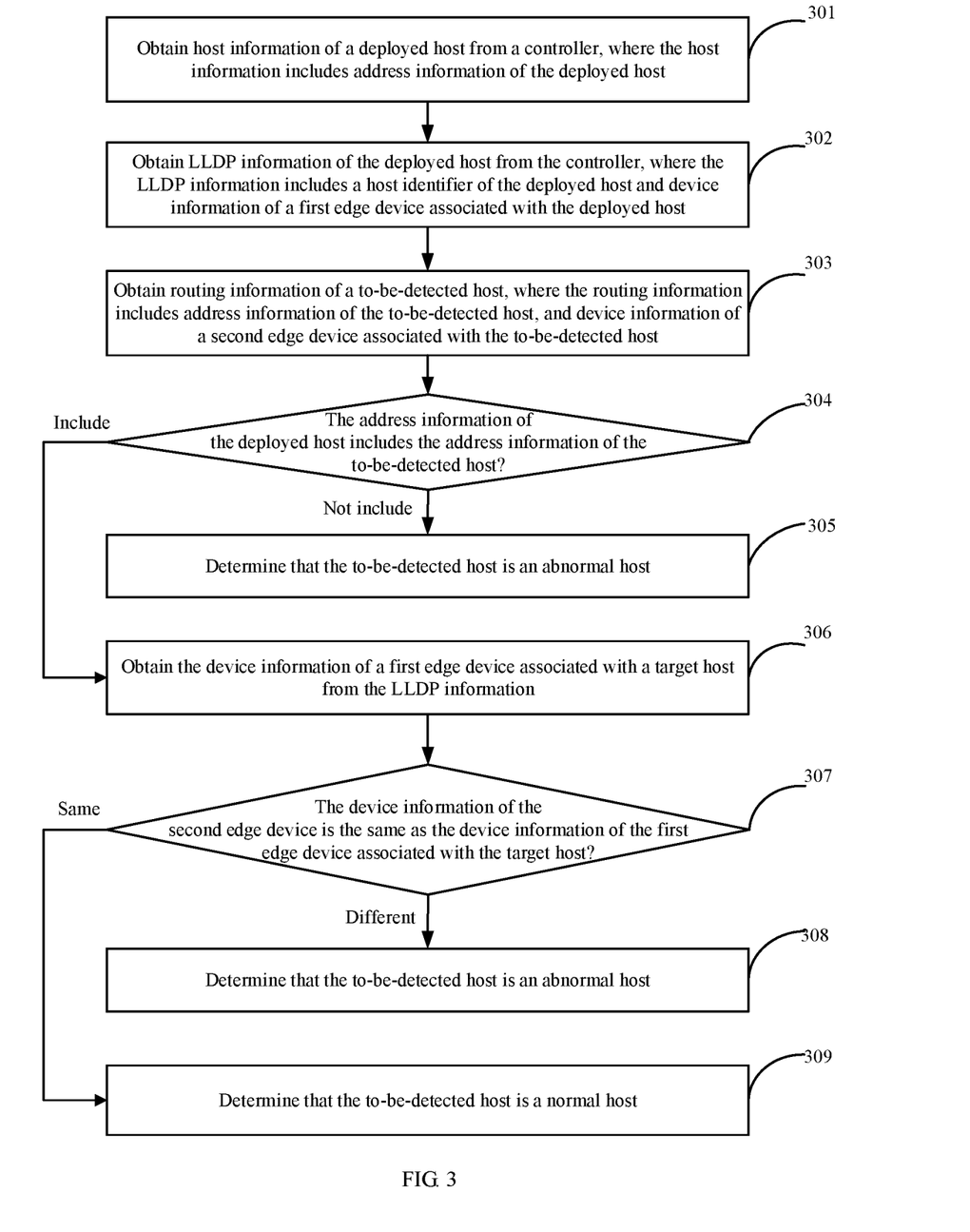
FIG. 3 is a flowchart illustrating a method of monitoring an abnormal host according to another example of the present disclosure.

In the above application scenario, the present disclosure also provides another method of monitoring an abnormal host. FIG. 3 is a flowchart illustrating a method of monitoring an abnormal host. As shown in FIG. 3, the method may be applied to a data processing device and the method may include the following steps.

At step 301, host information of a deployed host is obtained from a controller, where the host information includes address information of the deployed host. In addition, the host information may include a host identifier of the deployed host.

For the implementation of step 301, reference can be made to step 201, which will not be elaborated here.

At step 302, LLDP information of the deployed host is obtained from the controller, where the LLDP information includes the host identifier of the deployed host and device information of a first edge device associated with the deployed host.

Referring to the above example, the controller has stored the LLDP information of all deployed hosts in the EVPN. Therefore, the data processing device can obtain the LLDP information of all deployed hosts in the EVPN from the controller. As shown in Table 2, the LLDP information may include, but is not limited to, a host identifier of a deployed host, and device information of a first edge device associated with the deployed host.

At step 303, routing information of a to-be-detected host is obtained, where the routing information includes address information of the to-be-detected host and device information (such as an IP address and/or a MAC address) of a second edge device associated with the to-be-detected host. An edge device which is associated with the to-be-detected host may be referred as the second edge device. For the implementation of step 303, reference can be made to step 202, which will not be elaborated herein.

At step 304, it is determined whether the address information of the deployed host includes the address information of the to-be-detected host.

If the address information of the deployed host does not include the address information of the to-be-detected host, it can proceed to perform step 305, and if the address information of the deployed host includes the address information of the to-be-detected host, it can proceed to perform step 306.

At step 305, it is determined that the to-be-detected host is an abnormal host.

In an example, as shown in Table 1, the data processing device can obtain the host information of all deployed hosts in the EVPN from the controller. Based on this, when the host information shown in Table 1 does not include the address information of the to-be-detected host, it can be determined that the to-be-detected host is an abnormal host. When the host information shown in Table 1 includes the address information of the to-be-detected host, it can proceed to perform step 306 and subsequent steps.

At step 306, device information of a first edge device associated with a target host is obtained from the LLDP information. For convenience of description, in examples, a deployed host with the same address information as the to-be-detected host is referred to as a target host.

Referring to the above example, the host information of the deployed host includes the address information of the deployed host and the host identifier of the deployed host. The LLDP information includes the host identifier of the deployed host, the device information of the first edge device associated with the deployed host. The routing information includes the address information of the to-be-detected host.

Based on this, in the case that the address information of the deployed host includes the address information of the to-be-detected host, obtaining the device information of the first edge device associated with the target host from the LLDP information may include: obtaining the host identifier of the target host by querying the host information according to the address information of the target host (the address information of the target host is the same as the address information of the to-be-detected host), and obtaining the device information of the first edge device associated with the target host by querying the LLDP information according to the host identifier of the target host.

For example, as shown in Table 1, since the host information includes the correspondence between the address information and the host identifier, the data processing device can query the host information shown in Table 1 by using the address information of the to-be-detected host to determine a host identifier of a deployed host (i.e., the target host) that has the same address information as the to-be-detected host.

For example, if the address information of the to-be-detected host is IP address A, MAC address A, and network identifier VNI1, by querying the host information shown in Table 1 according to this address information of the to-be-detected host, it may match and obtain the host identifier of the target host being aaa. As another example, if the address information of the to-be-detected host is IP address B, MAC address B, and network identifier VNI1, by querying the host information shown in Table 1 according to this address information of the to-be-detected host, it can match and obtain the host identifier of the target host being bbb.

After obtaining the host identifier of the target host as aaa, LLDP information shown in Table 2 is queried by using host identifier aaa, so as to obtain the device information of the first edge device associated with the target host as IP address 1 and MAC address 1.

At step 307, it is determined whether the device information of the second edge device (that is, the device information carried in the routing information) is the same as the device information of the first edge device associated with the target host.

If the device information of the second edge device is different from the device information of the first edge device associated with the target host, it can proceed to perform step 308; if the device information of the second edge device and the device information of the first edge device associated with the target host are the same, it can proceed to perform step 309.

Referring to the above example, the routing information of the to-be-detected host includes the device information of the second edge device, and the device information of the first edge device associated with the target host has been obtained. Therefore, at step 307, it can be decided whether the device information of the second edge device associated with the to-be-detected host is the same as the device information of the first edge device associated with the target host.

At step 308, it is determined that the to-be-detected host is an abnormal host.

At step 309, it is determined that the to-be-detected host is a normal host.

In one case, as shown in FIG. 1, when host 111 (assuming the to-be-detected host) gets online, host 111 can send an ARP packet to edge device 121. If host 111 is a normal host, the ARP packet carries real address information, such as IP address A and MAC address A.

Upon receiving the ARP packet, edge device 121 can generate a BGP message for host 111 and send the BGP message to routing management device 131. Upon receiving the BGP message, routing management device 131 can send the BGP message to data processing device 161.

The BGP message may include routing information. The routing information can include, but is not limited to, IP address A of host 111, MAC address A of host 111, a network identifier (such as VNI1) of the host 111, and device information (IP address 1 and MAC address 1) of edge device 121. The device information of edge device 121 is the device information of the second edge device associated with the to-be-detected host.

In this case, the address information of host 111 included in the routing information is IP address A, MAC address A, and network identifier VNI1. Data processing device 161 can decide whether the host information shown in Table 1 includes this address information. Since the host information shown in Table 1 includes this address information, the host identifier of a target host corresponding to the address information can be obtained from the host information, such as host identifier aaa. Then, data processing device 161 can query the LLDP information shown in Table 2 by using host identifier aaa to obtain the device information corresponding to host identifier aaa, that is, the device information is IP address 1 and MAC address 1. The device information corresponding to host identifier aaa is the device information of the first edge device associated with the target host.

In view of the above, the device information of the second edge device associated with the to-be-detected host is IP address 1 and MAC address 1, and the device information of the first edge device associated with the target host is IP address 1 and MAC address 1. That is to say, the two pieces of device information are the same. Therefore, it can be determined that host 111 is a normal host.

In another case, as shown in FIG. 1, when host 111 (assuming the to-be-detected host) gets online, host 111 can send an ARP packet to edge device 121. If host 111 is an abnormal host (e.g., an attacker), the ARP packet carries the address information forged by the attacker. Assuming that the attacker forged the address information of host 112, the ARP packet carries IP address B and MAC Address B.

Upon receiving the ARP packet, edge device 121 can generate a BGP message for host 111 and send the BGP message to routing management device 131. Upon receiving the BGP message, routing management device 131 can send the BGP message to data processing device 161.

The BGP message may include routing information, and the routing information may include, but is not limited to, IP address B of host 111, MAC address B of host 111, a network identifier (such as VNI1) of host 111, and device information (IP address 1 and MAC address 1) of edge device 121.

In this case, the address information of host 111 included in the routing information is IP address B, MAC address B, and network identifier VNI1. Data processing device 161 can decide whether the host information shown in Table 1 includes this address information. Since the host information shown in Table 1 includes this address information, the host identifier of a target host corresponding to the address information can be obtained from the host information, such as host identifier bbb. Then, data processing device 161 can query the LLDP information shown in Table 2 by using host identifier bbb to obtain the device information corresponding to host identifier bbb, that is, the device information is IP address 2 and MAC address 2. The device information corresponding to host identifier bbb is device information of the first edge device associated with the target host.

In view of the above, the device information of the second edge device associated with the to-be-detected host is IP address 1 and MAC address 1, and the device information of the first edge device associated with the target host is IP address 2 and MAC address 2. That is to say, the two pieces of device information are different. Therefore, it can be determined that host 111 is an abnormal host.

In view of the above, when host 111 sends an ARP packet, even if the ARP packet carries the address information of a legitimate host, which is forged by the attacker, data processing device 161 can identify host 111 as an abnormal host.

In an example, when determining that host 111 is an abnormal host, data processing device may also generate alarm information for network administrators to handle an attack behavior, and the processing process is not described again.

Based on the above technical solution, in the examples of the present disclosure, even if an attacker forged the address information of a normal host, the data processing device (usually a big data processing system) can analyze whether the to-be-detected host is an abnormal host, thereby improving the accuracy of identifying normal hosts and abnormal hosts, and fully utilize the data collection and data processing capabilities of the big data processing system. The above method does not require the controller to analyze whether the to-be-detected host is an abnormal host, which can reduce workload of the controller, save processing resources of the controller, and improves processing performance of the controller. In the above method, based on big data technology, whether the to-be-detected host is an abnormal host is analyzed, and host behavior analysis, anomaly detection, and error correction are performed, so that network administrators can accurately obtain the network access information of each host and quickly perceive the abnormal access behavior of a host.

In the above example, after the data processing device obtains the routing information of the to-be-detected host (such as the address information, and the device information of the edge device associated with the to-be-detected host), it may further include: determining whether an entry corresponding to the to-be-detected host exists in a historical database; if the entry corresponding to the to-be-detected host exists in the historical database, storing the routing information and an obtaining time of the routing information in the entry; if no entry corresponding to the to-be-detected host exists in the historical database, the entry corresponding to the to-be-detected host is added to the historical database, and the routing information and the obtaining time of the routing information are stored in the newly added entry.

For example, Table 3 is an example of a historical database, which is used to record routing information. However, Table 3 is only an example, and can also include other contents, which is not limited.

TABLE 3

| Serial Number | Address Information of Host | Device Information of Edge Device at the Next Hop of Host | Obtaining Time | State |
|---|---|---|---|---|
| A | IP address A, MAC address A and network identifier VNI1 | IP address 1 and MAC address 1 | Time A | Normal |
| B | IP address B, MAC address B and network identifier VNI1 | IP address 2 and MAC address 2 | Time B | Normal |
| | IP address B, MAC address B and | IP address 3 and MAC address 3 | Time C | Abnormal |

TABLE 3-continued

| Serial Number | Address Information of Host | Device Information of Edge Device at the Next Hop of Host | Obtaining Time | State |
|---|---|---|---|---|
| | network identifier VNI1 | | | |

In an example, if host 111 gets offline and gets back online, host 111 can resend an ARP packet. Upon receiving the ARP packet, edge device 121 can send a BGP message to routing management device 131. Routing management device 131 can send a BGP message to data processing device 161, and data processing device 161 finally obtains the routing information of host 111. This process will not be elaborated here. For details, reference can be made to the above examples. The routing information includes address information of host 111 (such as IP address A, MAC address A, and network identifier VNI1), and device information of edge device 121 (such as IP address 1 and MAC address 1). Data processing device 161 can also determine the obtaining time of the routing information, such as time D.

In the example of the present disclosure, data processing device 161 can further decide whether an entry corresponding to the address information (such as IP address A, MAC address A, and network identifier VNI1) exists in the historical database shown in Table 3. Since it exists, the correspondence among IP address A, MAC address A and network identifier VNI1, IP address 1 and MAC address 1, and the time D is stored in this entry, as shown in Table 4.

TABLE 4

| Serial Number | Address Information of Host | Device Information of Edge Device at the Next Hop of Host | Obtaining Time | State |
|---|---|---|---|---|
| A | IP address A, MAC address A and a network identifier VNI1 | IP address 1 and MAC address 1 | Time A | Normal |
| | IP address A, MAC address A and a network identifier VNI1 | IP address 1 and MAC address 1 | Time D | Normal |
| B | IP address B, MAC address B and a network identifier VNI1 | IP address 2 and MAC address 2 | Time B | Normal |
| | IP address B, MAC address B and a network identifier VNI1 | IP address 3 and MAC address 3 | Time C | Abnormal |

In view of the above, in the example of the present disclosure, since the big data system can store a massive amount of information, data processing device 161 can add routing information to the entry instead of replacing the existing routing information in the entry. That is, the routing information may be stored for a long time, and the information may be saved and retrieved quickly in chronological order. Since the big data system can store a massive amount of information, the historical database not only stores the information during normal routing, but also stores the information during abnormal routing. The historical database can also be queried according to the historical time, so as to support tracing back for a cause of long-term abnormal access behavior. For example, as shown in Table 3 or Table 4 above, a host corresponding to IP address B, MAC address B and network identifier VNI1 occurred abnormality at time C. Therefore, based on the massive amount of information with time sequence attributes stored in the big data system, it is possible to quickly trace back the abnormal access behavior at any point in history.

In the above examples, data processing device 161 can include a data collector and a data analyzer. The data collector is configured to implement data collection, and the data analyzer is configured to implement data analysis. Based on this, steps 301 to 303 can be performed by the data collector, and steps 304 to 309 can be performed by the data analyzer.

Figure 4:
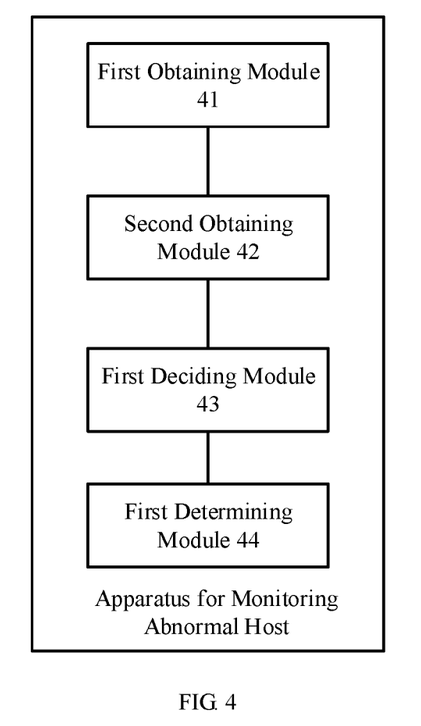
FIG. 4 is a block diagram illustrating an apparatus for monitoring an abnormal host according to an example of the present disclosure.

Based on the same application concept as the above methods, an example of the present disclosure also provides an apparatus for monitoring an abnormal host, which is applied to a data processing device. FIG. 4 is a block diagram of the apparatus, as shown in FIG. 4, the apparatus includes the following modules.

A first obtaining module 41 is configured to obtain host information of a deployed host from a controller, where the host information includes address information of the deployed host.

A second obtaining module 42 is configured to obtain routing information of a to-be-detected host, where the routing information includes address information of the to-be-detected host.

A first deciding module 43 is configured to determine whether the address information of the deployed host includes the address information of the to-be-detected host.

A first determining module 44 is configured to determine that the to-be-detected host is an abnormal host when the address information of the deployed host does not include the address information of the to-be-detected host.

In one example, the apparatus further includes (not shown in the figure): an establishing module configured to negotiate with a routing management device to establish a BGP peer with the routing management device; and the second obtaining module 42 is specifically configured to: receive the routing information of the to-be-detected host which is sent by the routing management device.

In one example, the apparatus further includes (not shown in the figure): a third obtaining module configured to obtain LLDP information of the deployed host from the controller, where the LLDP information includes device information of a first edge device associated with the deployed host. If the address information of the deployed host includes the address information of the to-be-detected host, the apparatus further includes (not shown in the figure): a fourth obtaining module configured to obtain device information of a first edge device associated with a target host from the LLDP information, where the target host is a deployed host that has the same address information as the to-be-detected host; and a second determining module configured to, when device information of a second edge device associated with the to-be-detected host is different from the device information of the first edge device associated with the target host, determine that the to-be-detected host is an abnormal host, where the device information of the second edge device associated with the to-be-detected host is included in the routing information.

In one example, the host information further includes a host identifier of the deployed host, and the LLDP information further includes a host identifier of the deployed host;

and the fourth obtaining module is specifically configured to obtain a host identifier of the target host by querying host information of the target host according to address information of the target host; and obtain the device information of the first edge device associated with the target host by querying LLDP information of the target host according to the host identifier of the target host.

In one example, the second determining module is further configured to, when the device information of the second edge device associated with the to-be-detected host is the same as the device information of the first edge device associated with the target host, determine that the to-be-detected host is a normal host.

In one example, the apparatus further includes (not shown in the figure): a second deciding module configured to, after the second obtaining module obtains the routing information of the to-be-detected host, determine whether an entry corresponding to the to-be-detected host exists in a historical database; a storage module configured to, when the entry corresponding to the to-be-detected host exists in the historical database, store the routing information and an obtaining time of the routing information in the entry; and an adding module configured to, when no entry corresponding to the to-be-detected host exists in the historical database, add the entry corresponding to the to-be-detected host in the historical database, and store the routing information and the obtaining time of the routing information in the newly added entry.

Figure 5:
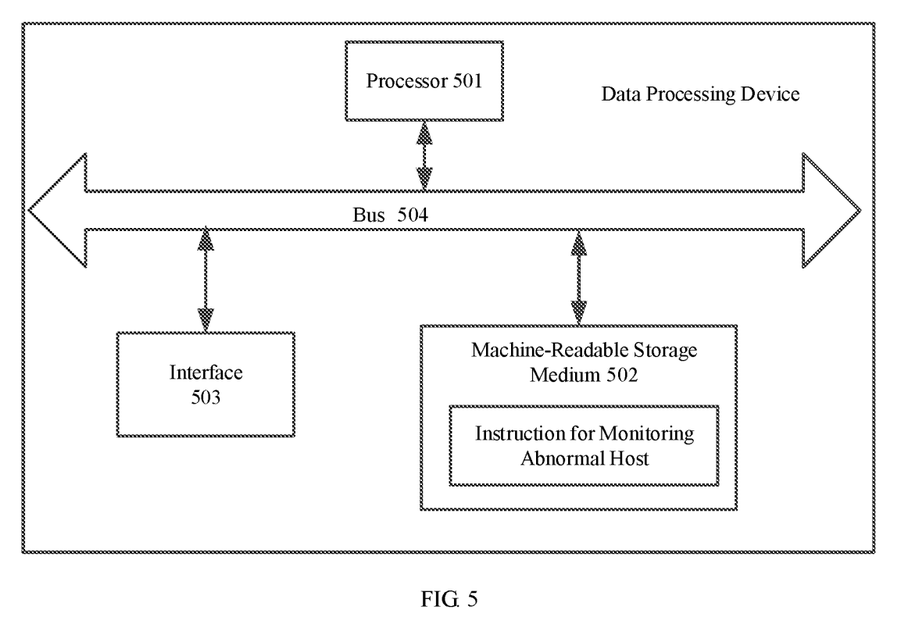
FIG. 5 is a hardware structural diagram illustrating a data processing device according to an example of the present disclosure.

A data processing device is provided in an example of the present disclosure. From a hardware level, a hardware structural schematic diagram of the data processing device may be specifically shown in FIG. 5. The data processing device includes a machine-readable storage medium 502 and a processor 501. The data processing device may further include an interface 503 and a bus 504. The machine-readable storage medium 502 stores machine-executable instructions that can be executed by the processor 501. The processor 501 communicates with the machine-readable storage medium 502, reads and executes the machine-executable instructions stored in the machine-readable storage medium 502, and implements operations of monitoring an abnormal host disclosed in the above examples of the present disclosure. The interface 503 can be used to connect with the controller and the routing management device. The processor 501, the machine-readable storage medium 502, and the interface 503 can communicate with each other through the bus 504.

Here, the machine-readable storage medium can be any electronic, magnetic, optical, or other physical storage device, and can include or store information such as executable instructions, data, and so on. For example, the machine-readable storage medium can be a volatile memory, including RAM (Random Access Memory), and a non-volatile memory, including a flash memory, a storage drive (such as a hard drive), a solid state drive, any type of storage disk (such as a compact disk, a DVD, and the like), or a similar storage medium, or a combination thereof.

The system, apparatus, module, or unit described in the above examples can be specifically implemented by a computer chip or entity or a product with a certain function. A typical implementation device is a computer, and the specific form of the computer can be a personal computer, a laptop computer, a cellular phone, a camera phone, a smart phone, a personal digital assistant, a media player, a navigation device, an email sending and receiving device, and a game console, a tablet computer, a wearable device, or a combination of any of these devices.

For convenience of description, when describing the above apparatus, the functions are divided into various modules and described separately. However, when implementing the present disclosure, the functions of each module may be implemented in the same or multiple software and/or hardware.

Those skilled in the art should understand that the examples of the present disclosure can be provided as a method, a system, or a computer program product. Therefore, the present disclosure can take the form of an entirely hardware example, an entirely software example, or an example combining software and hardware aspects. Furthermore, the examples of the present disclosure can take the form of a computer program product implemented on one or more computer-usable storage media (including but not limited to disk storages, CD-ROMs, optical storages, and the like) including computer-usable program codes.

The present disclosure is described with reference to flowcharts and/or block diagrams of methods, apparatuses (systems), and computer program products according to examples of the present application. It should be understood that each process and/or block in the flowcharts and/or block diagrams, and combinations of processes and/or blocks in the flowcharts and/or block diagrams, can be implemented by computer program instructions. These computer program instructions may be provided to a processor of a general-purpose computer, a special-purpose computer, an embedded processor, or other programmable data processing device to produce a machine, so that instructions executed by the processor of the computer or other programmable data processing device may be used to produce a means for implementing the functions specified in one or more processes of the flowcharts and/or one or more blocks of the block diagrams.

Furthermore, these computer program instructions may also be stored in a computer-readable memory capable of directing a computer or other programmable data processing device to work in a specific manner, so that the instructions stored in the computer-readable memory produce an article of manufacture including an instruction device, and the instruction device implements function(s) specified in one or more processes of the flowcharts and/or one or more blocks of the block diagrams.

These computer program instructions can also be loaded onto a computer or other programmable data processing device, so that a series of operating steps can be executed on the computer or other programmable device to produce a computer-implemented process. Thus, the instructions executed on the computer or other programmable device provide steps for implementing the function(s) specified in one or more processes of the flowcharts and/or one or more blocks of the block diagrams.

The above descriptions are merely examples of the present application, and are not used to limit the present application. For those skilled in the art, the present disclosure may have various modifications and changes. Any modification, equivalent replacement, and improvement made within the spirit and principle of the present disclosure shall be included in the scope of claims of the present disclosure.

The invention claimed is:

1. A method of monitoring an abnormal host, being applied to a data processing device, comprising:
obtaining host information of a deployed host from a controller, wherein the host information comprises address information of the deployed host;

negotiating with a routing management device to establish a Border Gateway Protocol (BGP) peer with the routing management device;
obtaining routing information of a to-be-detected host, comprising:
receiving the routing information of the to-be-detected host which is sent by the routing management device, wherein the routing information comprises address information of the to-be-detected host;
determining whether the address information of the deployed host comprises the address information of the to-be-detected host; and
determining that the to-be-detected host is an abnormal host when the address information of the deployed host does not comprise the address information of the to-be-detected host.

2. The method according to claim 1, wherein
obtaining Link Layer Discovery Protocol (LLDP) information of the deployed host from the controller, wherein the LLDP information comprises device information of a first edge device associated with the deployed host; and
when the address information of the deployed host comprises the address information of the to-be-detected host, the method further comprises:
obtaining device information of a first edge device associated with a target host from the LLDP information, wherein the target host is a deployed host that has the same address information as the to-be-detected host; and
when device information of a second edge device associated with the to-be-detected host is different from the device information of the first edge device associated with the target host, determining that the to-be-detected host is an abnormal host, wherein the device information of the second edge device associated with the to-be-detected host is comprised in the routing information.

3. The method according to claim 2, wherein the host information further comprises a host identifier of the deployed host, the LLDP information further comprises a host identifier of the deployed host; and obtaining the device information of the first edge device associated with the target host from the LLDP information comprises:
obtaining a host identifier of the target host by querying host information of the target host based on address information of the target host; and
obtaining the device information of the first edge device associated with the target host by querying LLDP information of the target host based on the host identifier of the target host.

4. The method according to claim 2, further comprising:
when the device information of the second edge device associated with the to-be-detected host is the same as the device information of the first edge device associated with the target host, determining that the to-be-detected host is a normal host.

5. The method according to claim 1, wherein after obtaining the routing information of the to-be-detected host, the method further comprises:
determining whether an entry corresponding to the to-be-detected host exists in a historical database;
when the entry corresponding to the to-be-detected host exists in the historical database, storing the routing information and an obtaining time of the routing information in the entry; and
when no entry corresponding to the to-be-detected host exists in the historical database, adding the entry corresponding to the to-be-detected host in the historical database, and storing the routing information and the obtaining time of the routing information in the newly added entry.

6. An apparatus for monitoring an abnormal host, being applied to a data processing device, comprising:
a processor, and
a non-transitory storage medium storing machine-executable instructions, wherein by reading and executing the machine-executable instructions, the processor is caused to:
obtain host information of a deployed host from a controller, wherein the host information comprises address information of the deployed host;
negotiate with a routing management device to establish a Border Gateway Protocol (BGP) peer with the routing management device;
obtain routing information of a to-be-detected host, comprising:
receiving the routing information of the to-be-detected host which is sent by the routing management device, wherein the routing information comprises address information of the to-be-detected host;
determine whether the address information of the deployed host comprises the address information of the to-be-detected host; and
determine that the to-be-detected host is an abnormal host when the address information of the deployed host does not comprise the address information of the to-be-detected host.

7. The apparatus according to claim 6, the processor is further caused to:
obtain LLDP information of the deployed host from the controller, wherein the LLDP information comprises device information of a first edge device associated with the deployed host; and
when the address information of the deployed host comprises the address information of the to-be-detected host, the processor is further caused to:
obtain device information of a first edge device associated with a target host from the LLDP information, wherein the target host is a deployed host that has the same address information as the to-be-detected host; and
when device information of a second edge device associated with the to-be-detected host is different from the device information of the first edge device associated with the target host, determine that the to-be-detected host is an abnormal host, wherein the device information of the second edge device associated with the to-be-detected host is comprised in the routing information.

8. The apparatus according to claim 7, wherein the host information further comprises a host identifier of the deployed host, and the LLDP information further comprises a host identifier of the deployed host; and
when obtaining the device information of the first edge device associated with the target host from the LLDP information, the processor is further caused to obtain a host identifier of the target host by querying host information of the target host based on address information of the target host; and obtain the device information of the first edge device associated with the target host by querying LLDP information of the target host based on the host identifier of the target host.

9. The apparatus according to claim 7, the processor is further caused to:
when the device information of the second edge device associated with the to-be-detected host is the same as the device information of the first edge device associated with the target host, determine that the to-be-detected host is a normal host.

10. The apparatus according to claim 6, the processor is further caused to:
after obtaining the routing information of the to-be-detected host, determine whether an entry corresponding to the to-be-detected host exists in a historical database;
when the entry corresponding to the to-be-detected host exists in the historical database, store the routing information and an obtaining time of the routing information in the entry; and
when no entry corresponding to the to-be-detected host exists in the historical database, add the entry corresponding to the to-be-detected host in the historical database, and store the routing information and the obtaining time of the routing information in the newly added entry.

11. A data processing device, comprising:
a non-transitory machine-readable storage medium and a processor; wherein,
the non-transitory machine-readable storage medium is configured to store machine-readable instructions; and
the processor is configured to invoke the machine-readable instructions to execute operations comprising:
obtaining host information of a deployed host from a controller, wherein the host information comprises address information of the deployed host;
negotiating with a routing management device to establish a BGP peer with the routing management device;
obtaining routing information of a to-be-detected host, comprising:
receiving the routing information of the to-be-detected host which is sent by the routing management device, wherein the routing information comprises address information of the to-be-detected host;
determining whether the address information of the deployed host comprises the address information of the to-be-detected host; and
determining that the to-be-detected host is an abnormal host when the address information of the deployed host does not comprise the address information of the to-be-detected host.

12. The device according to claim 11, wherein the operations further comprising:
obtaining LLDP information of the deployed host from the controller, wherein the LLDP information comprises device information of a first edge device associated with the deployed host; and
when the address information of the deployed host comprises the address information of the to-be-detected host, the operations further comprising:
obtaining device information of a first edge device associated with a target host from the LLDP information, wherein the target host is a deployed host that has the same address information as the to-be-detected host; and
when device information of a second edge device associated with the to-be-detected host is different from the device information of the first edge device associated with the target host, determining that the to-be-detected host is an abnormal host, wherein the device information of the second edge device associated with the to-be-detected host is comprised in the routing information.

13. The device according to claim 12, wherein the host information further comprises a host identifier of the deployed host, the LLDP information further comprises a host identifier of the deployed host; and
when obtaining the device information of the first edge device associated with the target host from the LLDP information, the operations further comprising:
obtaining a host identifier of the target host by querying host information of the target host based on address information of the target host; and
obtaining the device information of the first edge device associated with the target host by querying LLDP information of the target host based on the host identifier of the target host.

14. The device according to claim 12, wherein the operations further comprising:
when the device information of the second edge device associated with the to-be-detected host is the same as the device information of the first edge device associated with the target host, determining that the to-be-detected host is a normal host.

15. The device according to claim 11, wherein after obtaining the routing information of the to-be-detected host, the operations further comprising:
determining whether an entry corresponding to the to-be-detected host exists in a historical database;
when the entry corresponding to the to-be-detected host exists in the historical database, storing the routing information and an obtaining time of the routing information in the entry; and
when no entry corresponding to the to-be-detected host exists in the historical database, adding the entry corresponding to the to-be-detected host in the historical database, and storing the routing information and the obtaining time of the routing information in the newly added entry.

\* \* \* \* \*